J. PIERPONT.
WHIFFLETREE EYE.
No. 170,896.
Patented Dec. 7, 1875.
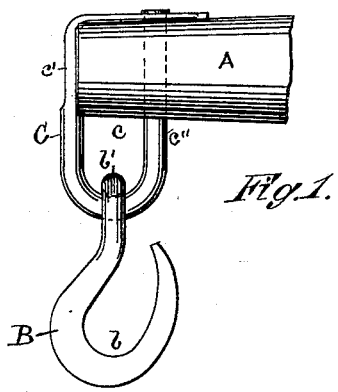
Fig. 1.
Fig. 2.
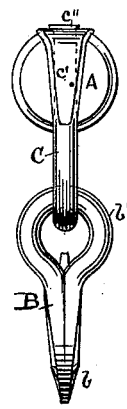
Fig. 3.
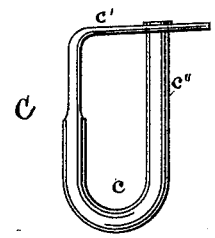

UNITED STATES PATENT OFFICE.

JOSHUA PIERPONT, OF BUSHNELL, ILLINOIS, ASSIGNOR TO PIERPONT & TUTTLE, OF SAME PLACE.

IMPROVEMENT IN WHIFFLETREE-EYES.

Specification forming part of Letters Patent No. 170,896, dated December 7, 1875; application filed November 3, 1875.

*To all whom it may concern:*

Be it known that I, JOSHUA PIERPONT, of Bushnell, county of McDonough and State of Illinois, have invented certain Improvements in Single-Tree Eyes; and I do hereby declare that the following is a full, clear, and exact description thereof, which will enable others skilled in the art to which it pertains to make and use the same, reference being had to the accompanying drawing, and to the letters of reference marked thereon, which form a part of this specification.

My invention relates to improvements in the eyes or loops for connecting the single-tree hooks to the ends of single-trees; and the invention consists in forming said eyes of a single piece of iron, bent to form an eye or loop of its central portion, and also bent so that one of its ends rests upon the rear side of the single-tree, its other end passing through the single-tree, and through the end in rear of the single-tree, where it is secured by riveting or otherwise, all as hereinafter fully described.

Figure 1 in the drawings is a top view of my improvement in place on a single-tree. Fig. 2 is an end view, and Fig. 3 is a top view of the eye alone.

Referring to the parts by letters, letter A represents one end of an ordinary single-tree. B is an ordinary single-tree hook, with a hook end, $b$, and eye end $b'$. C is my improved eye, its main or body portion bent, as shown in the drawings, to form a loop or eye, $c$, for receiving the eye $b'$ of the hook. One of its ends, $c'$, is extended back and bent, as shown in the drawings, so that it may rest against the rear side of the single-tree, while the other end, $c''$, is formed straight, and passes through the single-tree, and through a hole made in the end $c$, and is riveted or otherwise secured to said end $c$.

The body of the eye C may be made of round iron, or of any other suitable kind or shape, and the end $c'$ flattened to better adapt it to the rear side of the single-tree and to receive the end $c''$.

The foregoing description furnishes a cheap device, simple in construction, easily made and easily put in place, and more particularly adapted to single-trees for cultivators and other agricultural implements.

Having thus described my invention, what I claim as new, and desire to secure by Letters Patent, is—

The single-tree eye C, having the bent end $c'$, and straight end $c''$, and arranged to operate with the single-tree A and hook B, substantially as and for the purpose specified.

JOSHUA PIERPONT.

Witnesses:
   J. W. McELVAIN,
   G. H. McELVAIN.